(12) United States Patent
Kuo et al.

(10) Patent No.: US 8,006,257 B2
(45) Date of Patent: Aug. 23, 2011

(54) OPTICAL DISC HAVING GAS FLOW SPOILER AND THE METHOD FOR FABRICATING THE SAME

(75) Inventors: Chi-Pin Kuo, Hsinchu (TW);
Cheng-Hsiung Chen, Hsinchu (TW);
Chih-Feng Lin, Hsinchu (TW)

(73) Assignees: Princo Corp., Hsinchu (TW); Princo America Corp., Fremont, CA (US)

( * ) Notice: Subject to any disclaimer, the term of this patent is extended or adjusted under 35 U.S.C. 154(b) by 374 days.

(21) Appl. No.: 12/418,577

(22) Filed: Apr. 4, 2009

(65) Prior Publication Data

US 2010/0107183 A1   Apr. 29, 2010

(30) Foreign Application Priority Data

Oct. 24, 2008  (TW) ............................... 97141023 A

(51) Int. Cl.
*G11B 7/24* (2006.01)
*B05D 5/06* (2006.01)

(52) U.S. Cl. ...................................... 720/718; 427/162
(58) Field of Classification Search .................. 720/718; 427/162

See application file for complete search history.

(56) References Cited

U.S. PATENT DOCUMENTS

| 5,212,679 | A  |   | 5/1993  | Tohkairin |
|-----------|----|---|---------|-----------|
| 5,504,646 | A  |   | 4/1996  | Tanaka et al. |
| 5,673,156 | A  |   | 9/1997  | Chen et al. |
| 5,987,003 | A  | * | 11/1999 | Yokota ............................ 369/280 |
| 2003/0039201 | A1 | * | 2/2003 | Fujii et al. ...................... 369/283 |
| 2005/0220991 | A1 | * | 10/2005 | Aoyama et al. ................ 427/128 |

* cited by examiner

*Primary Examiner* — Ly D Pham
(74) *Attorney, Agent, or Firm* — Pai Patent & Trademark Law Firm; Chao-Chang David Pai

(57) ABSTRACT

An optical disc includes a round opening at the center of the optical disc, an annular recording section configured to record information, an annular supporting section between the round opening and the annular recording section and configured to support the optical disc, and a spoiler provided on a non-read/write side of the annular recording section and configured to disturb the flow field inside the optical disc drive when the optical disc is rotating, the spoiler having a centerline average roughness between 2 μm and 10 μm, a thickness between 0.02 mm and 0.05 mm, an area occupying at least 5% of the non-read/write side. The flow field so disturbed changes from a laminar state to a turbulent state and thus the read/write characteristics of the disc is improved due to lower air resistance experienced by the rotating disc.

12 Claims, 11 Drawing Sheets

US 8,006,257 B2

OPTICAL DISC HAVING GAS FLOW SPOILER AND THE METHOD FOR FABRICATING THE SAME

BACKGROUND OF THE INVENTION

1. Field of the Invention

The invention relates to an optical disc having a spoiler and the method for fabricating the same.

2. Description of Related Art

The optical disc industry has been working on optical discs having higher rotational speed in keeping up with the demand for higher data transmission rates. Vibration or wobbling of the optical disc can occur when the disc undergoes rotation at a high speed. Such vibration can be due to rotation of the disc drive shaft or air resistance associated with the motion of the disc, both of which are major factors for causing the vibration. In the past the vibration of the optical disc was briefly looked at in the industry, and several solutions to this problem were offered but it did not generate much interest because the air resistance due to the then lower rotational speed was not too great an issue.

Today, it is not uncommon to see an optical disc rotate at a speed over 10,000 rpm. At such a high rotational speed, the air resistance so caused has caught more attention. An increase in air resistance caused by increasing the rotational speed of the optical disc not only causes the disc to vibrate but also increases the power consumption by the rotation motor driving the shaft. The latter phenomenon causes the optical read/write accuracy to vary, which affects the read/write characteristics and further weakens the drive's internal chip operation; deformation of the optical disc can also occur due to operation under high temperature, thus resulting in problems while reading/writing the optical disc or even inability to read due to disc damage. Moreover, the optical disc could deform under the high temperature, causing the read/write quality to deteriorate. In the worst scenario, the air resistance can inflict physical damages to the optical disc or even cause the optical disc to disintegrate.

There are known techniques for decreasing the vibration of a rotating optical disc by reducing the air resistance encountered by the disc. Most of the conventional techniques have considered changing the disc drive's structure to improve the airflow. For example, U.S. Pat. No. 7,181,749 discloses means for an optical disc to rotate with stability by adjusting the distance between the disc drive's upper cover and the disc such that there is a lowered pressure difference between the upper and the lower surfaces of the disc; and US Patent Application Publication No. 2006-0048171 discloses an improved shape of the upper cover of an optical disc drive having a function of guiding the airflow smoothly to stabilize the disc. These conventional techniques, however, may not be more effective or cost-effective than directly implementing airflow-altering structures on the optical disc per se.

BRIEF SUMMARY OF THE INVENTION

As explained above, the techniques in need for the optical disc industry are those altering the structure of the optical disc itself to reduce air resistance during high speed rotation so as to improve on the read/write characteristics of the disc under conditions associated with disc vibration, shaft loading of motor, power consumption, operational temperature, deformation under high temperature, write success rate, speed reduction, write time, etc.

To solve the problem above, the invention provides an optical disc including a round opening provided at the center of the optical disc, an annular recording section configured to record information, an annular supporting section provided between the round opening and the annular recording section and configured to support the optical disc, and a spoiler provided over the annular recording section at a non-read/write side of the optical disc and configured to reduce air resistance when the optical disc is rotating, the spoiler having a centerline average roughness Ra between 2 µm and 10 µm, a thickness between 0.02 mm and 0.05 mm, and an area occupying at least 5% of an entire disc surface at the non-read/write side of the optical disc.

The invention further provides a method for fabricating an optical disc that includes forming an annular substrate having a round opening provided at the center of the annular substrate, an annular recording section provided at an outer portion of the annular substrate to record information, and an annular supporting section provided between the round opening and the annular recording section to support the optical disc, and forming a spoiler over the annular recording section at a non-read/write side of the optical disc to reduce air resistance when the optical disc is rotating, the spoiler having a centerline average roughness between 2 µm and 10 µm, a thickness between 0.02 mm and 0.05 mm, and an area occupying at least 5% of an entire disc surface at the non-read/write side of the optical disc.

As compared to the conventional techniques of complicated and expensive methods of reconstructing the structure of the optical disc drive to improve the internal airflow condition and therefore the rotational stability of the optical disc, the invention directly provides a spoiler on the optical disc to disturb the flow field such that the flow field is changed from a laminar state to a turbulent state, thereby reducing the air resistance encountered by the rotating disc and improving the read/write characteristics of the disc under conditions associated with disc vibration, shaft loading of motor, power consumption, operational temperature, deformation under high temperature, write success rate, speed reduction, write time, etc. The invention therefore provides a simpler structure, a simpler fabricating method, a lower manufacturing cost, and a higher performance than the conventional techniques.

BRIEF DESCRIPTION OF THE DRAWINGS

FIG. 9(*b*) shows the distribution of curves representing the relationship between the vibration frequency and the vibration intensity (amplitude) of an optical disc of Embodiment 2 at different rotational speeds. FIG. 9(*c*) shows the distribution of curves representing the relationship between the vibration frequency and the vibration intensity of an optical disc of Embodiment 3 at different rotational speeds.

DETAILED DESCRIPTION OF THE INVENTION

Figure 1:
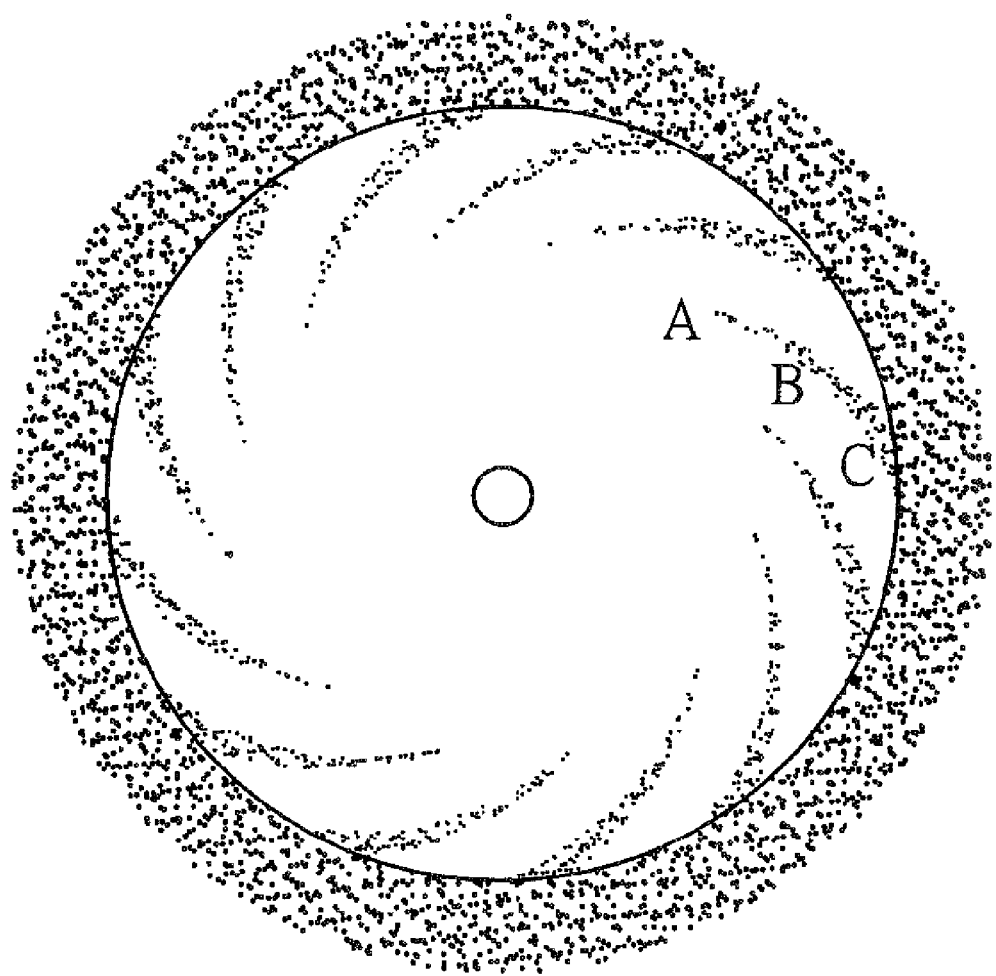
FIG. 1 is a schematic diagram showing the state of the flow field for an optical disc rotating inside an optical disc drive at a certain speed.
Figure 2:
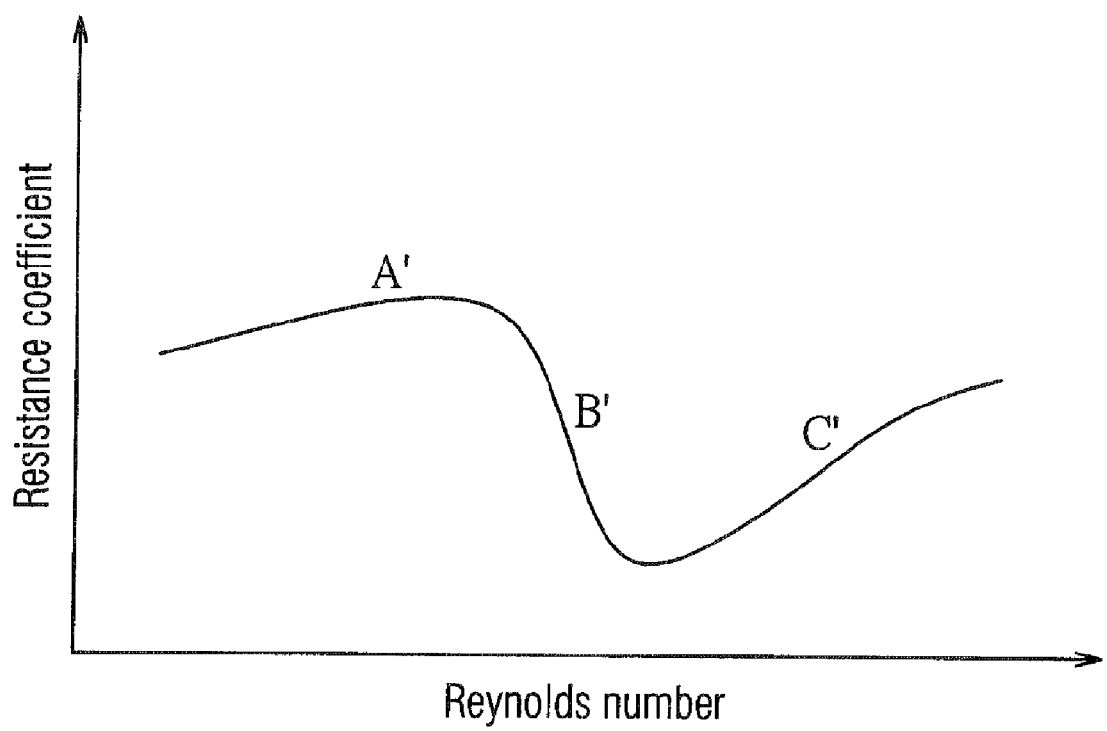
FIG. 2 illustrates the relationship between resistance coefficient and Reynolds number of the flow field for an optical disc rotating inside an optical disc drive.

FIGS. 1 and 2 illustrate the relationship between the flow field and the air resistance for a rotating optical disc inside an optical disc drive.

In a conventional optical disc drive, the state of the flow field changes with the rotational speed of the optical disc. When the optical disc is rotating at a low speed and as a result the air is flowing at a low speed, the air remains in parallel layers of moving air which do not mix. At this point, the flow field is said to be in a laminar state. When the air speed gradually increases, the streamlines of the airflow start to oscillate in a wave form, and both the frequency and the amplitude of the oscillation increase with speed. The flow field is said to be in a transitional state. When the air speed increases considerably, the streamlines are no longer distinct and many vortices start to exist in the flow field. At this point, the airflow becomes unsteady and develops into a turbulent and irregular flow with any small variation in speed. The flow field is then said to be in a turbulent state.

FIG. 1 is a schematic diagram showing the state of the flow field for an optical disc rotating inside an optical disc drive when reaching a certain speed. When the optical disc achieves a certain rotational speed, as shown in FIG. 1, the flow field over an inner annular region of the disc is in a laminar state A; the flow field over an outer annular region of the disc is in a turbulent state C; and the flow field over a region between the two annular regions is in a transitional state B that corresponds to the laminar-turbulent transition.

FIG. 2 illustrates the relationship between resistance coefficient and Reynolds number of the flow field for an optical disc rotating inside an optical disc drive. In FIG. 2, the vertical axis represents the resistance coefficient, a measure of air resistance encountered by the optical disc rotating inside the optical disc drive. The resistance coefficient increases as the optical disc rotates faster, which means the air resistance encountered is increasing. On the other hand, the horizontal axis represents the Reynolds number, a measure of the ratio of inertial forces and viscous forces of the moving air. The Reynolds number is proportional to the rotational speed of the optical disc (the speed of the airflow).

In FIG. 2, section A' of the curve indicates that the flow field inside the optical disc drive is in a laminar state. Section B' of the curve indicates that the flow field inside the drive starts to transit from a laminar state to a turbulent state as the optical disc increases its rotational speed, and the Reynolds number at which the flow changes state is known as the critical Reynolds number. Section C' of the curve indicates that the flow field has transited into a turbulent state with an increasing disc speed.

As shown in FIG. 2, when the airflow speed is low, i.e. when the optical disc rotates at a lower speed, the Reynolds number is small, which means the viscous forces of the moving air have a relatively larger impact on the flow field than the inertial forces. Therefore, any disturbance in the moving air of the flow field tends to be reduced by the viscous forces so that the moving air is in a steady condition and the flow field is in a laminar state. The resistance coefficient in the range of section A' is relatively larger and it gradually increases as the air speed increases.

When the rotational speed of the optical disc increases and so the air speed increases, the curve reaches the critical Reynolds number, at which the flow field transits from a laminar state to a turbulent state and the resistance coefficient drastically falls as shown by section B' of the curve.

When the rotational speed of the optical disc is high and so the air speed is high, the airflow has a large Reynolds number, which means the inertial forces have a relatively larger impact on the flow field than the viscous forces. Therefore, the flow field becomes unsteady and develops into a turbulent, irregular state with any small variation in speed. At this point, the resistance coefficient reaches a minimum value as shown by section C' of the curve, and then it slowly increases as the air speed continues increasing.

As can be observed in overall from the curve of FIG. 2, when the flow field enters from the transitional state B to the turbulent state C, it imposes relatively smaller air resistance on the optical disc rotation.

An objective of the invention is to provide a spoiler directly disposed on the surface of the optical disc to create higher surface roughness. The spoiler is capable of disturbing the airflow over a rotating optical disc inside the optical disc drive by converting the flow field in a laminar state into a turbulent state, whereby reducing the air resistance experienced by the rotating disc and resulting in the improvement in the read/write characteristics of the disc.

Figure 3A:
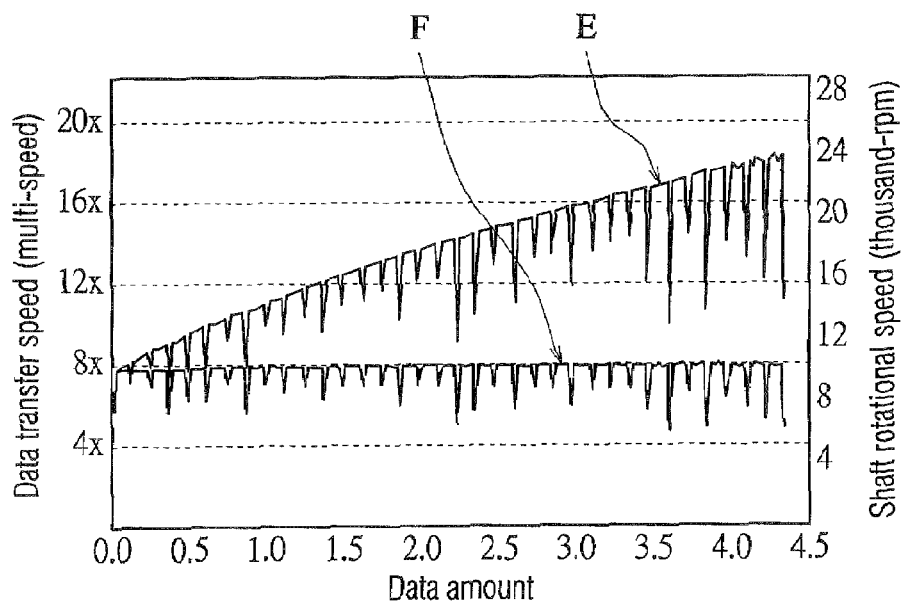
FIG. 3(a) illustrates the relationship among the rotational speed of the shaft of the optical disc drive, the data transfer rate, and the data transfer amount under a normal write condition of the optical disc.
Figure 3B:
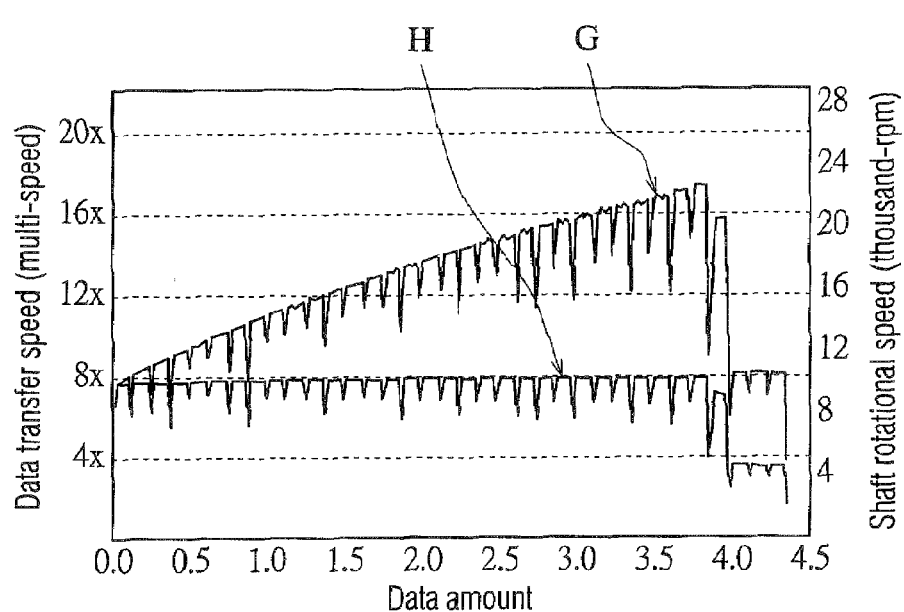
FIG. 3(b) illustrates the relationship among the rotational speed of the shaft of the optical disc drive, the data transfer rate, and the data transfer amount when a reduction in the speed occurs during writing of the optical disc.

Next, situations in which a normal write operation and a speed reduction of the optical disc drive occur are explained by referring to FIGS. 3(*a*) and 3(*b*). FIG. 3(*a*) illustrates the relationship among the rotational speed of the shaft of the optical disc drive, the data transfer rate, and data transfer amount under a normal write condition of the optical disc. FIG. 3(*b*) illustrates the relationship among the rotational speed of the shaft of the optical disc drive, the data transfer rate, and data transfer amount when a speed reduction occurs during writing of the optical disc.

In FIGS. 3(*a*) and 3(*b*), the left vertical axis represents the data transfer speed (multi-speed); the right vertical axis represents the shaft rotational speed (1,000 rotations per minute); and the horizontal axis represents the data transfer amount (gigabyte).

In FIG. 3(*a*), the curve E represents the data transfer speed of the optical disc in write operation ranging mainly from 8× to 18× multi-speeds, and the curve F represents the shaft rotational speed of the optical disc drive ranging mainly from 4 to 10 thousand-rpm. The curves indicate that the write operation is successfully completed.

Similarly, in FIG. 3(*b*), the curve G represents the data transfer speed ranging mainly from 8× to 18× multi-speeds, and the curve H represents the shaft rotational speed ranging mainly from 4 to 10 thousand-rpm. FIG. 3(*b*) differs from FIG. 3(*a*) in that, however, as shown in FIG. 3(*b*), a reduction in speed occurs when the data transfer amount exceeds 3.5 gigabytes, where both the data transfer speed for writing and the shaft rotational speed of the optical disc drive start to drop dramatically.

The speed reduction occurs when the write operation on an optical disc is affected by some adverse factors, the write program determines that if it were to continue with the current write mode or write speed, the write quality would be negatively affected or the disc on the completion of writing would not be recognized at all, and the program tries to change the write mode or reduce the write speed to assure the write quality.

Among the adverse factors are those involving the disc quality per se, which include, for example, warping or deformation of the disc, surface damage to the disc, and non-uniform coating of the data recording layer on the disc. Other adverse factors include extrinsic influences from, for example, abnormal forces acting externally on the disc to cause vibration, exceedingly large air resistance inside the optical disc drive, and exceedingly high operational temperature.

When the speed reduction occurs suddenly during writing of an optical disc, it means that the write operation is experiencing some of the adverse effects. However, errors in writing or damages to the disc resulting in inaccessible data could still occur despite that the drive tries to manage the write quality by reducing the speed.

Embodiment 1

Figure 4:
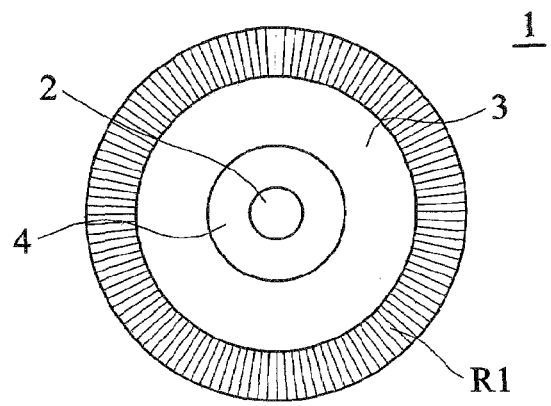
FIG. 4 is a plan view of an optical disc according to one aspect (Embodiment 1) of the invention.

FIG. 4 shows the structure of an optical disc according to Embodiment 1 of the invention, which illustrates the optical disc having one aspect of the invention. As shown in FIG. 4, the optical disc 1 includes a round opening 2 provided at the center of the optical disc 1, an annular recording section 3, an annular supporting section 4 provided between the round opening 2 and the annular recording section 3, and an annular spoiler R1 provided on the surface of the annular recording section 3 at its non-read/write side, the annular spoiler R1 having an inner diameter of 100 mm, an outer diameter of 120 mm, a width of 20 mm, a thickness of 0.02 mm, and a centerline average roughness of 3 µm.

Figure 5A:
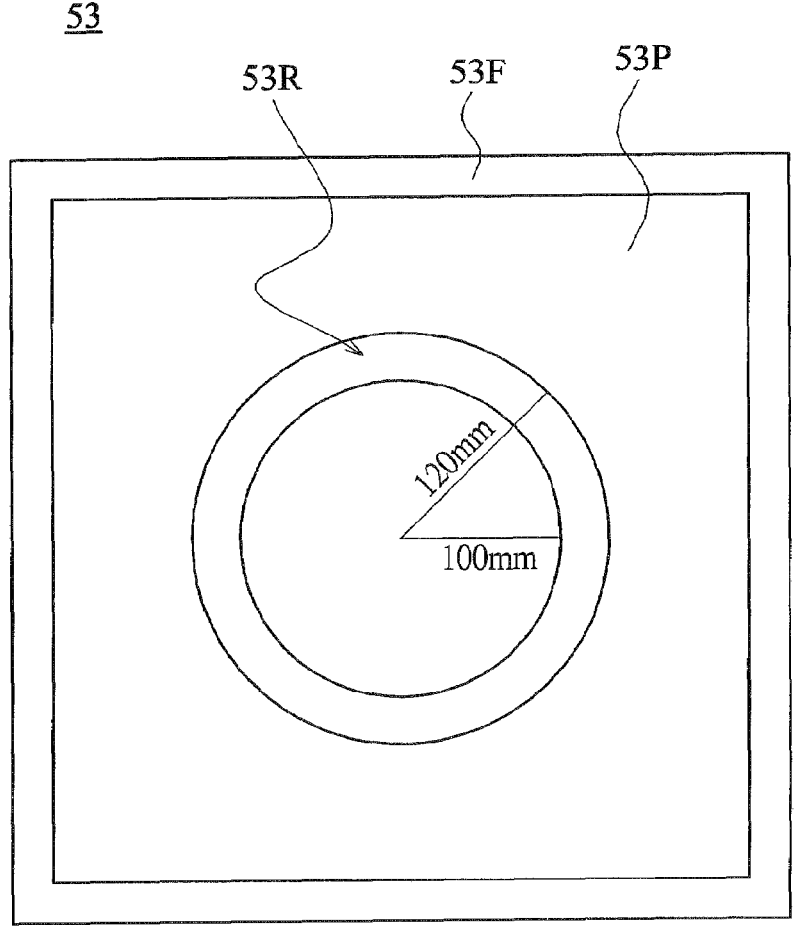
FIG. 5(a) shows a plan view of a printing apparatus.
Figure 5B:
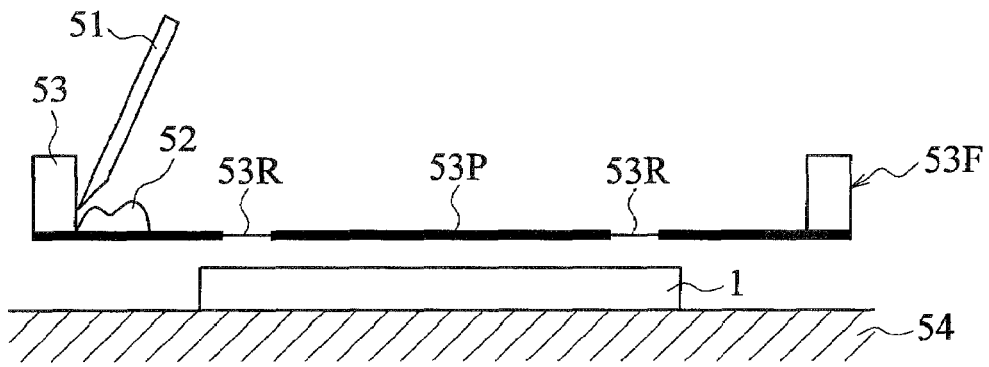
FIGS. 5(b) to 5(d) are schematic diagrams showing the steps of forming the annular spoiler on the optical disc using the printing method.
Figure 5C:
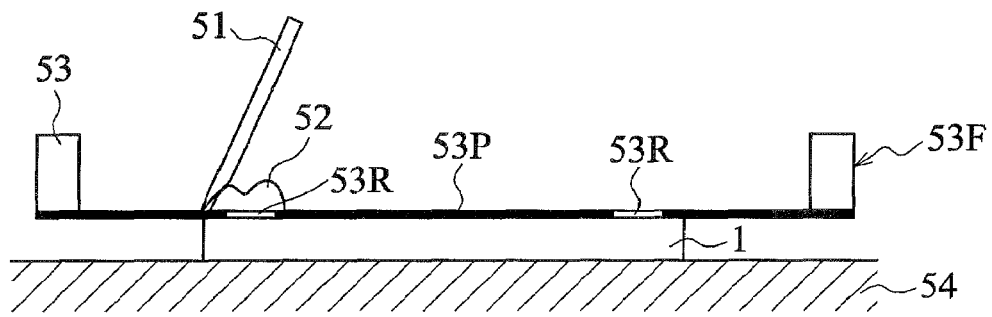
Figure 5D:
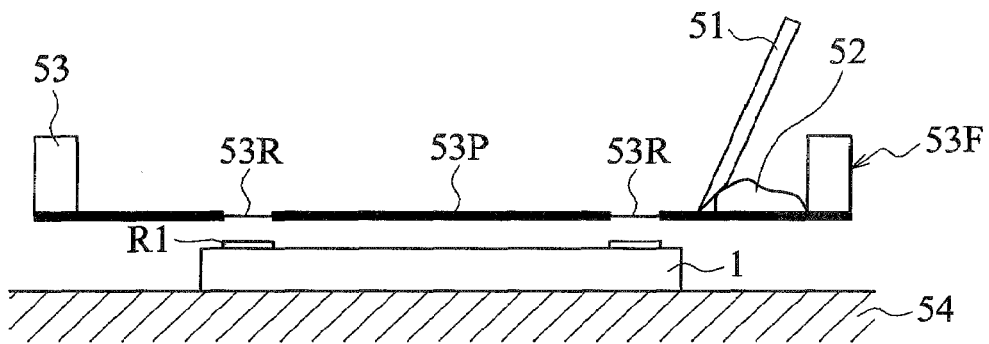

Next, FIGS. 5(a) to 5(d) illustrate the fabricating method of the optical disc of Embodiment 1. FIG. 5(a) shows a plan view of a printing apparatus 53, and FIGS. 5(b) to 5(d) are schematic diagrams showing the steps of forming the annular spoiler R1 on the optical disc 1 using the printing method. The fabricating method is explained as having the steps of: preparing an optical disc 1, as shown in FIG. 5(b), and placing the optical disc 1 on a platform 54; disposing UV glue 52 having a viscosity larger than, for example, 10,000 cps, on the printing apparatus 53, which, as shown in FIG. 5(a), is approximately square and has an area at least sufficient to cover the optical disc 1, and which is provided with an annular fine net 53R having a width, an inner diameter, and an outer diameter of 20 mm, 100 mm, and 120 mm respectively, a feeder plane 53P having a thickness of 0.02 mm, and a frame 53F, wherein unless subject to external forces, any of the UV glue 52 disposed on the annular fine net 53R does not pass through it because the UV glue 52 has a high viscosity of 10,000 cps; placing the printing apparatus 53 on the optical disc 1, as shown in FIG. 5(c); scraping the UV glue 52 with a scraper 51 over the annular fine net 53R such that the UV glue 52 is forced through the annular fine net 53R by the scraper 51; and lifting up the printing apparatus 53 from the optical disc 1 to form the annular spoiler R1 of FIG. 4 on the optical disc 1, as shown in FIG. 5(d). The extent to which the annular spoiler is formed is limited by the annular fine net 53R and the feeder plane 53P, and thus the annular spoiler R1 is formed with an inner diameter of 100 mm, an outer diameter of 120 mm, a width of 20 mm, and a thickness of 0.02 mm. A centerline average roughness Ra of 3 µm for the spoiler R1 is achieved by controlling several factors such as the mesh density of the annular fine net 53R, the magnitude of the scraping force by the scraper 51, the contact angle between the scraper 51 and the annular fine net 53R, the pulling forces causing the annular fine net 53R to adhere some of the UV glue 52 upwards when the printing apparatus 53 is being lifted up, and the viscosity of the UV glue 52.

Embodiment 2

Figure 6:
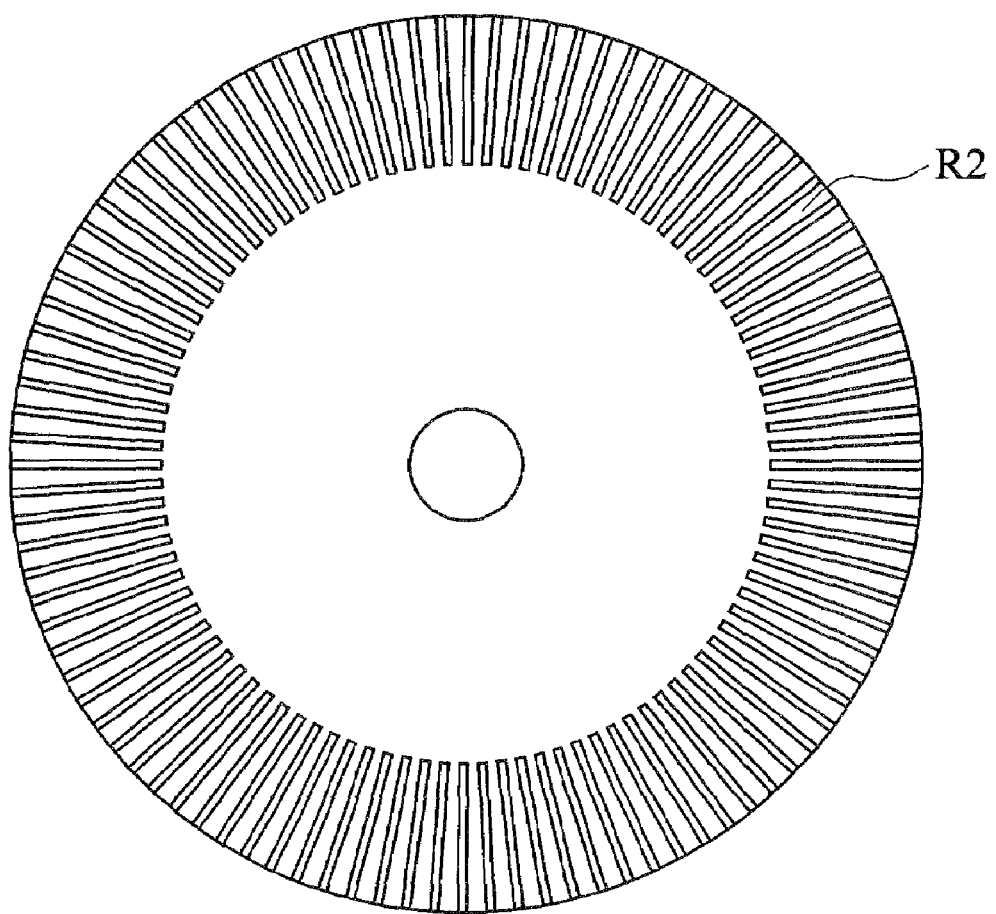
FIG. 6 is a plan view of an optical disc according to another aspect (Embodiment 2) of the invention.

FIG. 6 shows the structure of an optical disc according to Embodiment 2 of the invention, which illustrates the optical disc having another aspect of the invention. The optical disc of Embodiment 2 is identical to that of Embodiment 1, except that the spoiler R2 of Embodiment 2 is formed by printing a series of radially arranged stripes on an annular region. Due to the similarity between Embodiments 1 and 2, like reference numerals are not shown in FIG. 6. The spoiler R2 has an inner diameter of 105 mm, an outer diameter of 120 mm, a width of 15 mm, a thickness of 0.05 mm, and a centerline average roughness Ra of 10 µm.

The annular spoiler R2 formed of radially arranged stripes as shown in FIG. 6 can be formed by using the method of fine net printing as described above. The fine net printing method above can produce a centerline average roughness Ra controlled in the range of 1 µm to 3 µm, but has difficulty in achieving a roughness over 3 µm. Therefore, by repeatedly using the printing method to accumulate the radially arranged stripes to a thickness of 50 µm (i.e., 0.05 mm), the average centerline roughness Ra in the whole region of the annular spoiler R2 can be adjusted to 10 µm.

Embodiment 3

Figure 7:
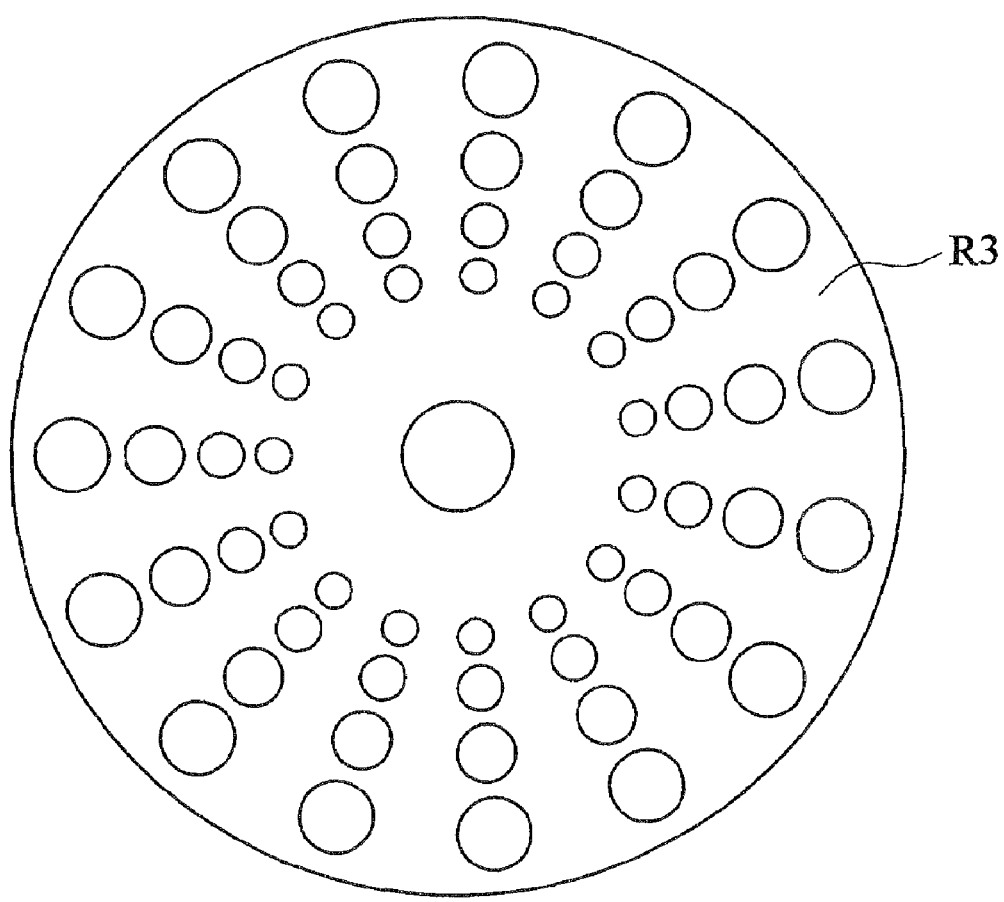
FIG. 7 is a plan view of an optical disc according to still another aspect (Embodiment 3) of the invention.

FIG. 7 shows the structure of an optical disc according to Embodiment 3 of the invention, which illustrates the optical disc having still another aspect of the invention. The optical disc of Embodiment 3 is identical to that of Embodiment 1, except that the spoiler R3 of Embodiment 3 is formed of a plurality of radially aligned round protrusions. Due to the similarity of this embodiment to Embodiment 1, like reference numerals are not shown in FIG. 7. The spoiler R3 has an inner diameter of 35 mm, an outer diameter of 115 mm, a width of 80 mm, a thickness of 0.04 mm for any round protrusion, and a centerline average roughness Ra of 6 µm in the whole region of the spoiler R3.

Embodiment 3 can be implemented as described next. First, a substrate with a track is formed using injection molding, and then after it is spin coated with dyes, sputtered with a metal layer, and coated with a protective layer, the substrate has a thickness of 0.6 mm. The substrate is then referred to as an "info disc". Next, a "compensator disc" is fabricated similarly using injection molding. By configuring the shape and thickness of the molded substrate, the compensator disc has a thickness of 0.6 mm and a surface formed with a plurality of round protrusions that are aligned radially around the center of the disc. The innermost round protrusions are at a distance of 35 mm from the center of the disc, and outermost round protrusions are at a distance of 115 mm from the center of the disc, so the width of the radially aligned protrusions spans a radial distance of 80 mm. Each protrusion has a thickness of 0.04 mm. The annular region distributed with the plurality of round protrusions (spoiler R3) has a centerline average roughness Ra of 6 µm. Finally, the info disc and the compensator disc are bonded together to form an optical disc with a total thickness of 1.2 mm.

[Read/Write Characteristics]

An actual write test is performed on the optical discs of Embodiments 1 and 2 to obtain the read/write characteristics of each disc. Two sets of 25 optical discs of Embodiments 1 and 2, each set for the respective embodiment, represent experimental groups 1 and 2. Another 50 conventional optical discs are divided into two sets of 25 optical discs as control groups 1 and 2. A same optical disc drive is then used to write on each set of discs at a 16× multi-speed, or 9.2 thousand-rpm of rotational speed. The write operation of each set of discs is recorded by noting, for example, whether the writing is completed normally, whether speed reduction occurs during writing, average write time, any damage resulting in inaccessibility of the disc, and average disc surface temperature upon completion of writing, as criteria for measuring performance of the discs. The results are summarized in Table 1.

TABLE 1

| | Group | | | |
| --- | --- | --- | --- | --- |
| | Control 1 | Experimental 1 | Control 2 | Experimental 2 |
| Normal write completion | 15 discs | 22 discs | 17 discs | 25 discs |
| Write speed reduction | 9 discs | 3 discs | 8 discs | 0 disc |
| Average write time | 5 min 42 sec | 5 min 20 sec | 5 min 40 sec | 5 min 15 sec |
| Damage causing inaccessibility of disc | 1 disc | no disc | no disc | no disc |
| Average disc surface temperature upon write completion (with no speed reduction) | 36.5° C. | 32.3° C. | 36.2° C. | 33.0° C. |

Among the 25 optical discs in the control group 1, 15 discs have completed normal write operation, 9 discs have had speed reduction, and 1 disc has been damaged and rendered unreadable. The average write time is 5 minutes 42 seconds, and the average disc surface temperature upon write completion (with no speed reduction) is 36.5° C.

Among the 25 optical discs in the experimental group 1, 22 discs have completed normal write operation, 3 discs have had speed reduction, and no disc has been damaged or rendered unreadable. The average write time is 5 minutes 20 seconds, and the average disc surface temperature upon write completion (with no speed reduction) is 32.3° C.

Among the 25 optical discs in the control group 2, 17 discs have completed normal write operation, 8 discs have had speed reduction, and no disc has been damaged or rendered unreadable. The average write time is 5 minutes 40 seconds, and the average disc surface temperature upon write completion (with no speed reduction) is 36.2° C.

Among the 25 optical discs in the experimental group 2, 25 discs have completed normal write operation, no disc has had speed reduction, and no disc has been damaged or rendered unreadable. The average write time is 5 minutes 15 seconds, and the average disc surface temperature upon write completion (no speed reduction) is 33.0° C.

As can be seen from above, compared with conventional optical discs, the optical discs of Embodiments 1 and 2 of the invention have better read/write characteristics; in particular, the write completion rate is higher; the occurrence of speed reduction is less; the average write time is shorter; and the average disc surface temperature upon write completion is lower. This improvement is because an optical disc of Embodiment 1, as compared to a conventional optical disc, is provided with an annular spoiler R1 having a 100 mm inner diameter, a 120 outer diameter, a 20 mm width, a 0.02 mm thickness, and a 3 μm centerline average roughness, and also because an optical disc of Embodiment 2, as compared to a conventional optical disc, is provided with an annular spoiler R2 having radially arranged stripes and having a 105 mm inner diameter, a 120 outer diameter, a 15 mm width, a 0.05 mm thickness, and a 10 μm centerline average roughness. The spoilers can disturb the airflow on rotating optical discs and cause a laminar flow field to change to a turbulent one, thereby reducing the air resistance encountered by the rotating discs. Therefore, a disc with a spoiler rotates with more stability and is less prone to vibration, and the read/write characteristics are improved.

[Vibration Characteristics]

Figure 9A:
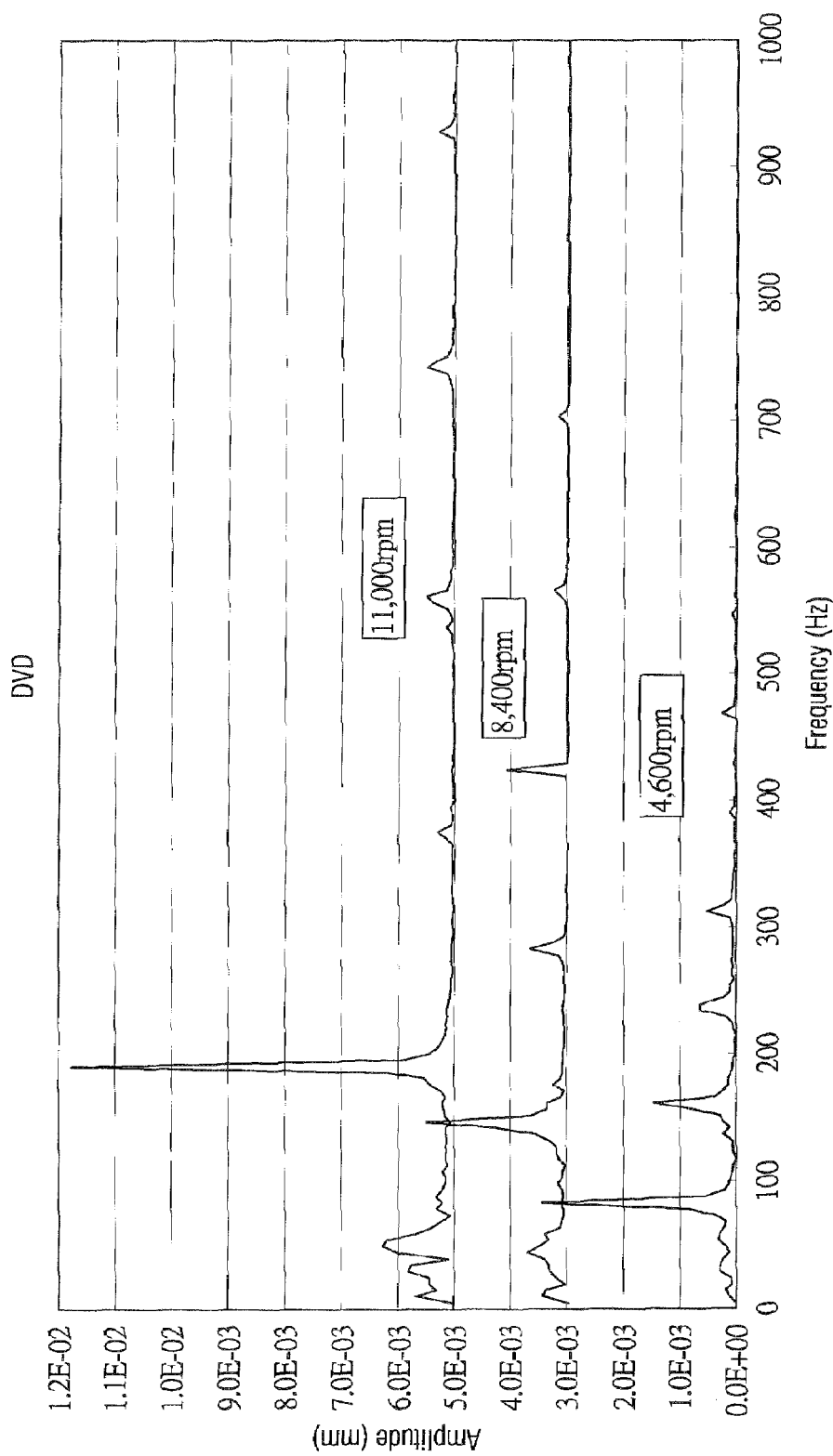
FIG. 9(*a*) shows the distribution of curves representing the relationship between the vibration frequency and the vibration intensity (amplitude) of a conventional optical disc at different rotational speeds.
Figure 9B:
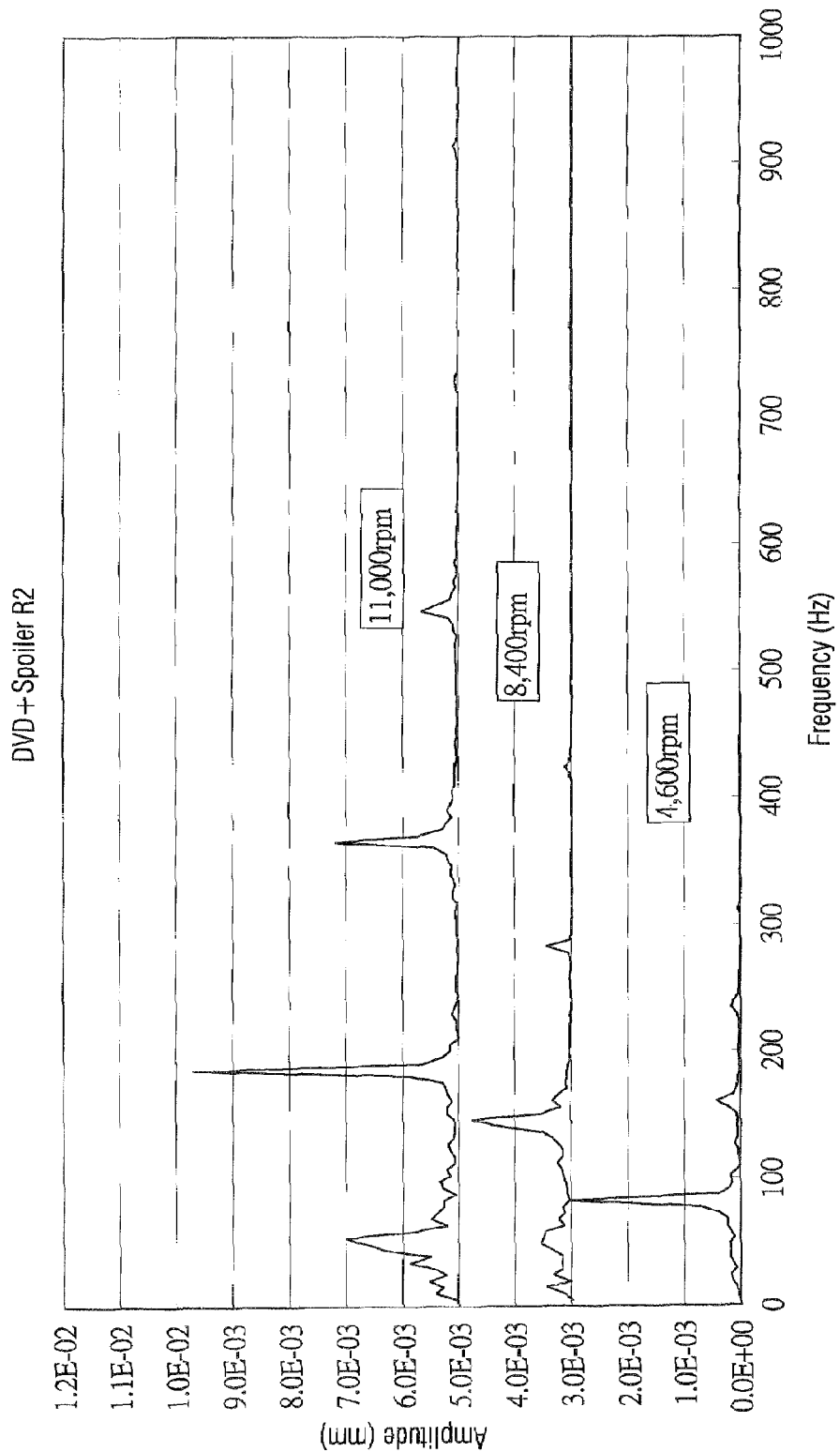
Figure 9C:
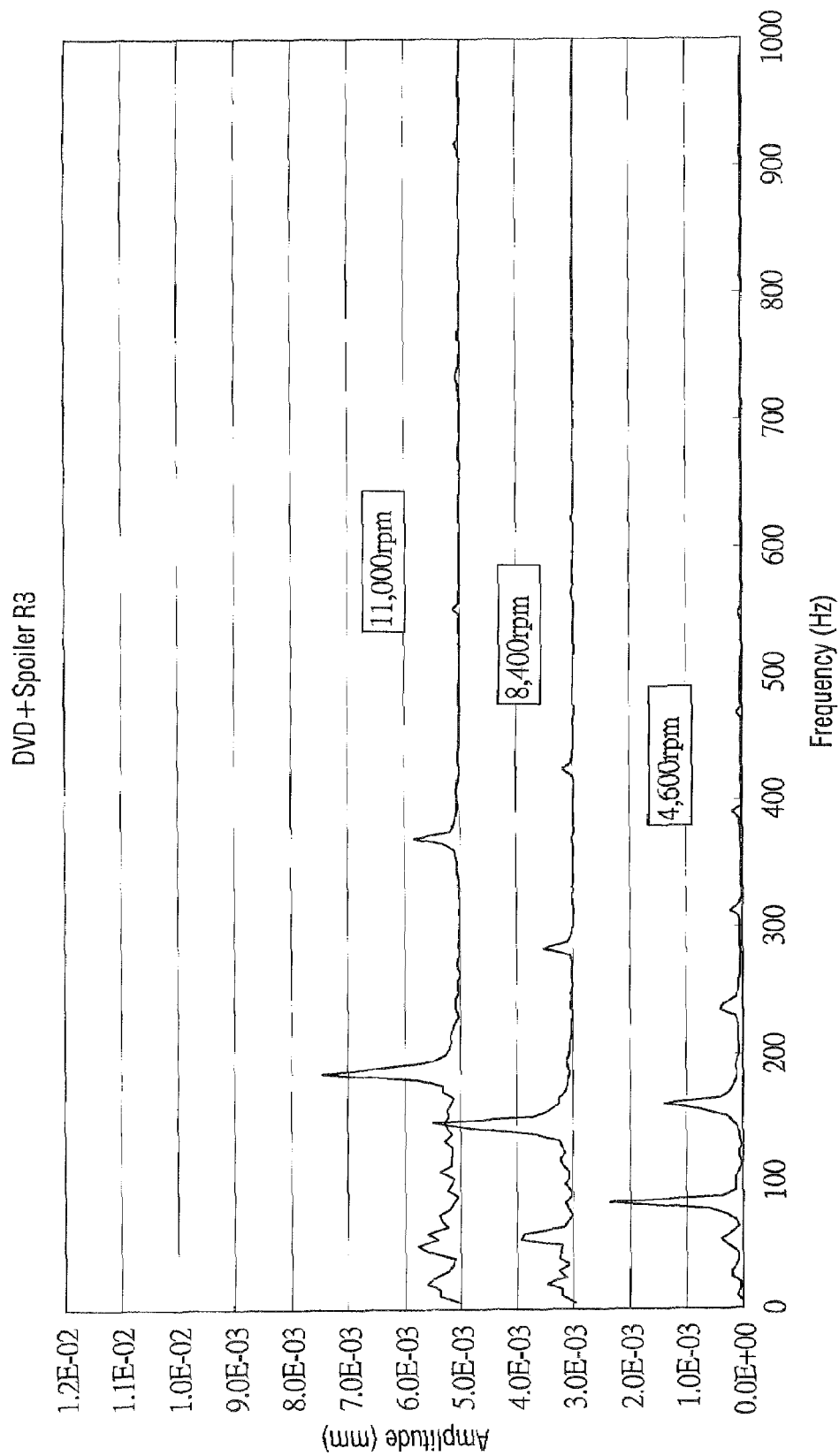

FIGS. 9(a)-9(c) illustrate the improvement on disc vibration for the optical discs of Embodiments 2 and 3. FIG. 9(a) shows the distribution of curves representing the relationship between the vibration frequency and the vibration intensity (amplitude) of a conventional optical disc at different rotational speeds. FIG. 9(b) shows the distribution of curves representing the relationship between the vibration frequency and the vibration intensity (amplitude) of an optical disc of Embodiment 2 at different rotational speeds. FIG. 9(c) shows the distribution of curves representing the relationship between the vibration frequency and the vibration intensity of an optical disc of Embodiment 3 at different rotational speeds.

In FIG. 9(a), the X axis represents the frequency of disc vibration in units of Hz, and the Y axis represents the intensity, or amplitude, in units of mm for every vibration frequency. The three curves from top to bottom indicate the distribution of the vibration frequency and the vibration intensity of a conventional optical disc rotating at a drive shaft speed of 4.6, 8.4, 11 thousand-rpm respectively. Similarly, in FIG. 9(b), the X axis represents the frequency of disc vibration in units of Hz, and the Y axis represents the intensity in units of mm for every vibration frequency. The three curves from top to bottom indicate the distribution of the vibration frequency and the vibration intensity of an optical disc of Embodiment 2 rotating at a drive shaft speed of 4.6, 8.4, 11 thousand-rpm respectively. The speeds of 4.6, 8.4, 11 thousand-rpm are properly selected by the inventor from a range of 3 to 12 thousand-rpm, sufficiently covering the reasonable range of speeds of a conventional optical disc drive, to represent low, medium, and high speeds.

For the 11 thousand-rpm curve in FIG. 9(a), a large vibration pulse amplitude peaking to 0.007 mm (0.012-0.005=0.007 mm) occurs at about 190 Hz. Also, there are several other vibration pulses with different amplitudes occurring between 300 and 1,000 Hz. On the other hand, for the 11 thousand-rpm curve in FIG. 9(b), a vibration pulse that occurs at about 190 Hz has an amplitude of just 0.005 mm (0.010-0.005=0.005 mm), and several other vibration pulses occurring between 300 and 1,000 Hz have relatively smaller amplitudes. In addition, by comparing the two 8.4 thousand-rpm curves in FIGS. 9(a) and 9(b), several vibration pulses occurring after 300 Hz on the 8.4 thousand-rpm curve in FIG. 9(a) are absent in FIG. 9(b). Likewise, by comparing the two 4.6 thousand-rpm curves in FIGS. 9(a) and 9(b), several vibration pulses occurring after 100 Hz on the 4.6 thousand-rpm curve in FIG. 9(a) have reduced intensity or are absent in FIG. 9(b).

As can be seen from the comparison of FIGS. 9(a) and 9(b), a conventional optical disc rotating at a range of reasonable read/write rotational speeds can improve the vibration characteristics if it is provided with a spoiler R2 of the invention. In particular, such disc with the spoiler R2 will have a significant vibration reduction at about the primary vibration frequency (190 Hz) and around high vibration frequencies (300 Hz-1,000 Hz).

Similarly, by comparing FIGS. 9(a) and 9(c), a conventional optical disc rotating at a range of reasonable read/write rotational speeds will cause less vibration if it is provided with a spoiler R3 of the invention. In particular, such disc with the spoiler R3 will have a significant vibration reduction at about the primary vibration frequency (190 Hz) and around high vibration frequencies (300 Hz-1,000 Hz).

All the results observed above can be explained as follows. By adding the spoiler to the conventional optical disc, the spoiler increases the overall roughness of the disc in such a way that the spoiler disturbs the airflow over the rotating disc in such manner that it changes the rotating disc's curve of resistance coefficient and Reynolds number. Specifically, when the spoiler is used, the reasonable read/write rotational speeds (about 3 to 12 thousand-rpm) fall within a range of smaller resistant coefficients, i.e., the optical disc rotating at a reasonable read/write rotational speed enables the flow field inside the optical disc drive to transit from a laminar state to a turbulent state, thereby reducing the air resistance against the rotating disc and therefore improving the vibration of the disc.

While the invention has been shown and described with reference to several embodiment thereof, and in terms of the illustrative drawings, it should not be considered as limited thereby. Various possible modifications, omissions, and alterations could be conceived of by one skilled in the art as to the form and the content of any particular embodiment, without departing from the scope of the invention.

Figure 8:
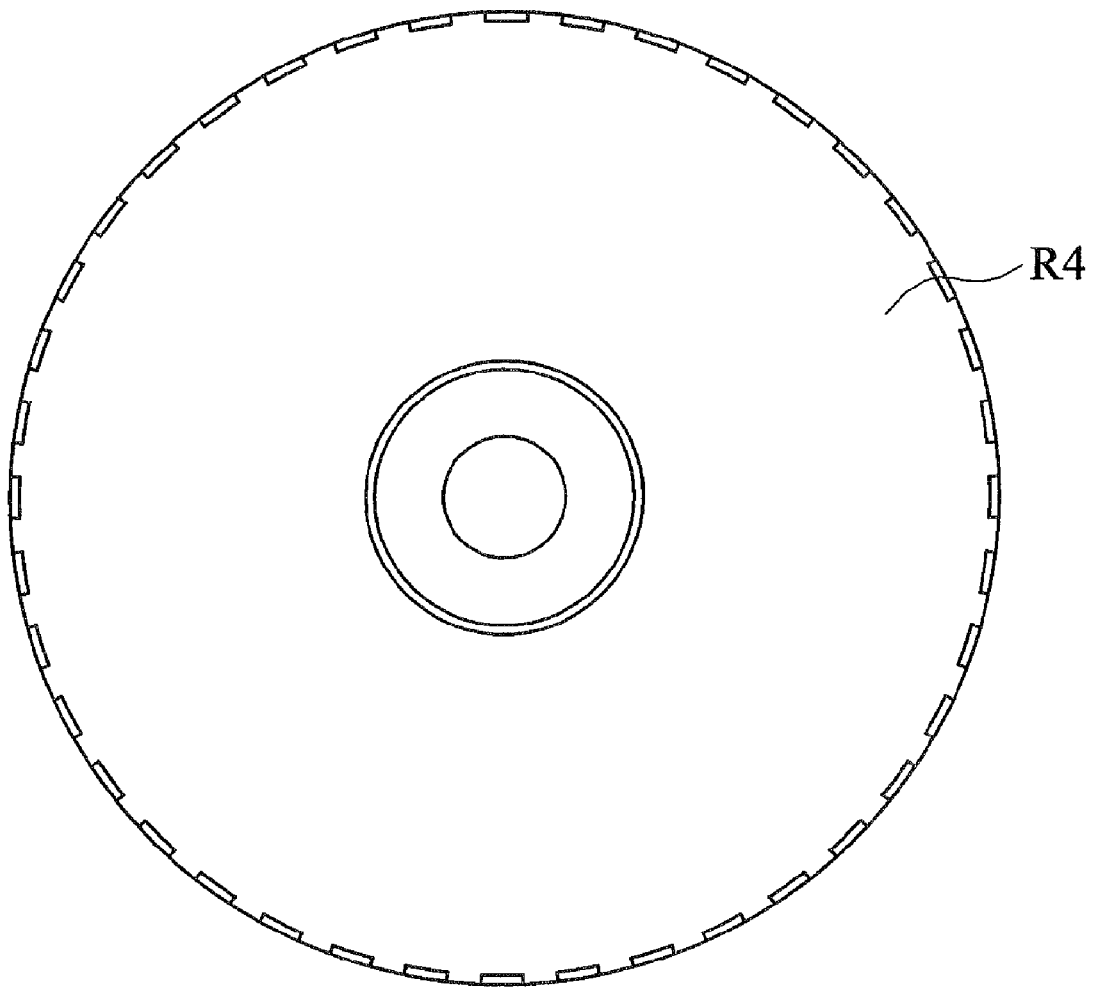
FIG. 8 is a plan view of an optical disc according to still another aspect of the invention.

Apart from the various aspects described above, a spoiler of the invention can be provided as a spoiler R4, as shown in FIG. 8. The spoiler R4 has a jagged protrusion around the circumferential edge of the disc. In other words, as long as a spoiler is provided over the recording section at its non-read/write side, and has a centerline average roughness between 2 μm and 10 μm, a thickness between 0.02 mm and 0.05 mm, and a projected area occupying at least 5% of the entire surface of the disc at the non-read/write side of the disc, the spoiler will allow the resistance coefficient of the airflow associated with a reasonable read/write speed to fall within the range of lower resistance coefficients during the entire rotation of the disc. As a consequence, the average air resistance is reduced for the entire rotation of the disc, and the read/write characteristics can be improved. It should be emphasized that a spoiler of the invention should not be confined to certain locations or limited in certain shapes as to be implemented as an aspect of the invention.

Furthermore, apart from the printing method described above, a spoiler of the invention can be formed having different locations, areas, shapes, thicknesses, roughness, etc. by properly selecting methods such as injection molding, hot mold stamping, attaching and the like and by using suitable materials according to each method used, among others needless to mention here. For the printing method, apart from the UV glue used in the embodiments, materials having a viscosity of about 5,000 to 15,000 cps, such as UV ink or ink including a volatile solution at normal temperature or under heated condition, can also be used for the invention. As for the injection mold and hot mold stamping methods, a material such as PC can be used, while for the attaching method, paper, Tetolon®, PVC, PET or the like can be used.

What is claimed is:

1. An optical disc, comprising:
    a round opening provided at the center of the optical disc;
    an annular recording section configured to record information;
    an annular supporting section provided between the round opening and the annular recording section and configured to support the optical disc; and
    a spoiler provided on a surface of the annular recording section at a non-read/write side of the annular recording section and configured to reduce air resistance when the optical disc is rotating, the spoiler having a centerline average roughness between 2 μm and 10 μm, a thickness between 0.02 mm and 0.05 mm, an area occupying at least 5% of the surface of the annular recording section at the non-read/write side of the annular recording section.

2. The optical disc in claim 1, wherein the spoiler is an annular layer.

3. The optical disc in claim 2, wherein the spoiler has a width between 15 mm and 20 mm.

4. The optical disc in claim 3, wherein the spoiler has an outer diameter of 120 mm.

5. The optical disc in claim 1, wherein the spoiler is annular and includes a plurality of striped protrusions.

6. The optical disc in claim 5, wherein the spoiler has a width between 15 mm and 20 mm.

7. The optical disc in claim 6, wherein the spoiler has an outer diameter of 120 mm.

8. The optical disc in claim 1, wherein the spoiler includes a plurality of round protrusions.

9. The optical disc in claim 8, wherein the plurality of round protrusions are aligned radially.

10. The optical disc in claim 9, wherein the plurality of round protrusions are distributed over an annular region defined between 25 mm and 115 mm from the center of the optical disc.

11. A method for fabricating an optical disc, comprising:
    forming an annular substrate having a round opening provided at the center of the annular substrate, an annular recording section provided at an outer portion of the annular substrate and configured to record information, and an annular supporting section provided between the round opening and the annular recording section and configured to support the optical disc; and
    forming a spoiler on a surface of the annular recording section at a non-read/write side of the annular recording section and configured to reduce air resistance when the optical disc is rotating, the spoiler having a centerline average roughness between 2 μm and 10 μm, a thickness between 0.02 mm and 0.05 mm, and an area occupying at least 5% of the surface of the annular recording section at the non-read/write side of the annular recording section.

12. The method of claim 11, wherein the spoiler is formed using printing, injection molding, hot mold stamping, or attaching.

* * * * *